(12) United States Patent
Takezawa et al.

(10) Patent No.: US 10,719,468 B2
(45) Date of Patent: Jul. 21, 2020

(54) USB MANAGEMENT SYSTEM AND USB MANAGEMENT METHOD USING USB RELAY DEVICE

(71) Applicant: HITACHI, LTD., Tokyo (JP)

(72) Inventors: Kei Takezawa, Tokyo (JP); Takuma Nishimura, Tokyo (JP); Hideki Tonooka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/462,952

(22) PCT Filed: Jan. 15, 2018

(86) PCT No.: PCT/JP2018/000774
§ 371 (c)(1),
(2) Date: May 22, 2019

(87) PCT Pub. No.: WO2018/139229
PCT Pub. Date: Aug. 2, 2018

(65) Prior Publication Data
US 2019/0278730 A1  Sep. 12, 2019

(30) Foreign Application Priority Data

Jan. 30, 2017  (JP) ................................ 2017-014534

(51) Int. Cl.
*G06F 13/38* (2006.01)
*G06F 13/40* (2006.01)
(Continued)

(52) U.S. Cl.
CPC .............. *G06F 13/382* (2013.01); *G06F 3/00* (2013.01); *G06F 13/14* (2013.01); *G06F 13/38* (2013.01);
(Continued)

(58) Field of Classification Search
CPC ...... G06F 21/85; G06F 13/42; G06F 13/4072; G06F 13/4252; G06F 13/4282
See application file for complete search history.

(56) References Cited

U.S. PATENT DOCUMENTS

| | | | |
|---|---|---|---|
| 7,788,425 B2 * | 8/2010 | Ikemoto .................. | G06F 21/57 710/113 |
| 8,230,149 B1 * | 7/2012 | Long ........................ | G06F 21/85 710/305 |

(Continued)

FOREIGN PATENT DOCUMENTS

| | | |
|---|---|---|
| JP | 2006-155217 A | 6/2006 |
| JP | 2008-197963 A | 8/2008 |
| JP | 2010-262335 A | 11/2010 |

OTHER PUBLICATIONS

"5-4 Studies on Countermeasures for Malicious USB Devices", by: Tatsuya Takehisa, Makoto Iwamura, and Hayato Ushimaru. Journal of the National Institute of Information and Communications Technology; vol. 63 No. 2; Dated 2016 (Year: 2016); 8 Pages.*

(Continued)

*Primary Examiner* — Brian T Misiura
(74) *Attorney, Agent, or Firm* — Mattingly & Malur, PC

(57) ABSTRACT

A USB management system using a USB relay device includes a management terminal having a management database for recording management information of a USB client registered in advance. The USB relay device has a connection switching unit for switching a connection state between a first connector portion to which the USB client is connected and a second connector portion which is connected to a USB host controller. When the USB client is connected to the first connector portion, the USB relay device reads management information of the USB client and transmits the management information to the management terminal, and the management terminal inquires of the (Continued)

management database about the management information of the USB client transmitted from the USB relay device, compares the management information with the management information of the USB client registered in advance, and determines the connection state by the connection switching unit.

12 Claims, 7 Drawing Sheets

(51) Int. Cl.
*G06F 16/17* (2019.01)
*G06F 3/00* (2006.01)
*G06F 13/14* (2006.01)

(52) U.S. Cl.
CPC ...... *G06F 13/4022* (2013.01); *G06F 16/1734* (2019.01); *G06F 2213/0042* (2013.01)

(56) References Cited

U.S. PATENT DOCUMENTS

| | | | | |
|---|---|---|---|---|
| 8,560,864 B2* | 10/2013 | Chang | ................ | G06F 21/567 713/193 |
| 8,862,803 B2* | 10/2014 | Powers | ................ | G06F 13/385 710/306 |
| 9,081,911 B2* | 7/2015 | Powers | ............... | G06F 13/4072 |
| 9,436,830 B2* | 9/2016 | Pomerantz | .............. | G06F 21/60 |
| 2012/0042099 A1* | 2/2012 | Wong | .................... | G06F 21/44 710/9 |
| 2014/0337558 A1* | 11/2014 | Powers | ............... | G06F 13/4072 710/313 |
| 2015/0365237 A1* | 12/2015 | Soffer | .................... | G06F 21/85 726/20 |
| 2016/0094369 A1* | 3/2016 | Chuyen | .................. | H04L 45/74 370/293 |
| 2016/0321195 A1 | 11/2016 | Ghosh et al. | | |
| 2016/0373408 A1* | 12/2016 | Wentworth | ........ | H04L 63/0227 |

OTHER PUBLICATIONS

Takehisa et al., USB Hub against the Malicious USB Devices, IEICE Technical Report, Feb. 24, 2015, vol. 114, No. 489, pp. 61-66.
International Search Report of PCT/JP2018/000774 dated Mar. 20, 2018.

* cited by examiner

USB MANAGEMENT SYSTEM AND USB MANAGEMENT METHOD USING USB RELAY DEVICE

TECHNICAL FIELD

The present invention relates to a USB management system and a USB management method using a USB relay device, particularly, to a USB management system and a USB management method for managing connection of a USB client to the USB relay device.

BACKGROUND ART

A USB mass storage is a great risk to various servers and computers. As the risk, for example, an information leakage may occur due to information extraction or a virus infection may occur due to virus mixture, on the contrary. For the risk, system measures are taken on the basis of thorough operation management. For example, use of the USB mass storage is restricted by installing device management software on each terminal or it is confirmed whether or not a virus is mixed in a file to be exchanged by installing antivirus software.

However, these software can be installed only in a corresponding operating system (OS) and the software cannot be applied to an Internet of things (IoT) device or a programmable logic controller (PLC) using an old computer or a dedicated OS. Further, in a computer used in a performance designed system such as a control system, since performance is affected by installation, it is difficult to install the software additionally.

Therefore, conventionally, a USB relay adapter type device is used to relay the device and connect the device to a USB memory, thereby executing a virus check of the file in an adapter (for example, refer to PTL 1). In PTL 1 (for example, a paragraph [0097]), "data including a computer virus program with which a computer is infected can be reliably prevented from infecting the USB memory connected to the computer." is described.

CITATION LIST

Patent Literature

PTL 1: JP 2010-262335 A

SUMMARY OF INVENTION

Technical Problem

However, since the conventional technology described in PTL 1 is based on the exchange of the file, a USB device that can be relayed is limited to the USB mass storage. For this reason, other USB devices such as a keyboard, a mouse, and a printer cannot be used in a state in which the USB relay adapter type device described in PTL 1 is mounted on a USB port of the computer.

An object of the present invention is to provide a USB management system and a USB management method using a USB relay device capable of coping with use of other USB devices such as a keyboard, a mouse, and a printer, in addition to a USB mass storage.

Solution to Problem

In order to achieve the above object, a USB management system according to the present invention is a USB management system using a USB relay device having a connection switching unit for switching a connection state between a first connector portion to which a USB client is connected and a second connector portion which is connected to a USB host controller. The USB management system includes a management terminal which has a management database for recording management information of the USB client registered in advance. When the USB client is connected to the first connector portion, the USB relay device reads the management information of the USB client and transmits the management information to the management terminal, and by inquiring of the management database about the management information of the USB client transmitted from the USB relay device and comparing the management information with the management information of the USB client registered in advance, the management terminal determines the connection state by the connection switching unit.

Further, in a USB management method according to the present invention, in a USB management system using a USB relay device having a connection switching unit for switching a connection state between a first connector portion to which the USB client is connected and a second connector portion which is connected to a USB host controller, and including a management terminal having a management database for recording management information of a USB client registered in advance, the USB management method includes when the USB client is connected to the first connector portion, reading the management information of the USB client and transmitting the management information to the management terminal, in the USB relay device, and by inquiring of the management database about the management information of the USB client transmitted from the USB relay device and comparing the management information with the management information of the USB client registered in advance, determining, in the management terminal, the connection state by the connection switching unit.

Advantageous Effects of Invention

According to the present invention, it is possible to cope with use of other USB devices such as a keyboard, a mouse, and a printer, in addition to a USB mass storage. Further, when an unexpected USB mass storage is used, this can be eliminated by switching control of a connection state (path between a first connector portion and a second connector portion) by a connection switching unit.

DESCRIPTION OF EMBODIMENTS

Figure 1:
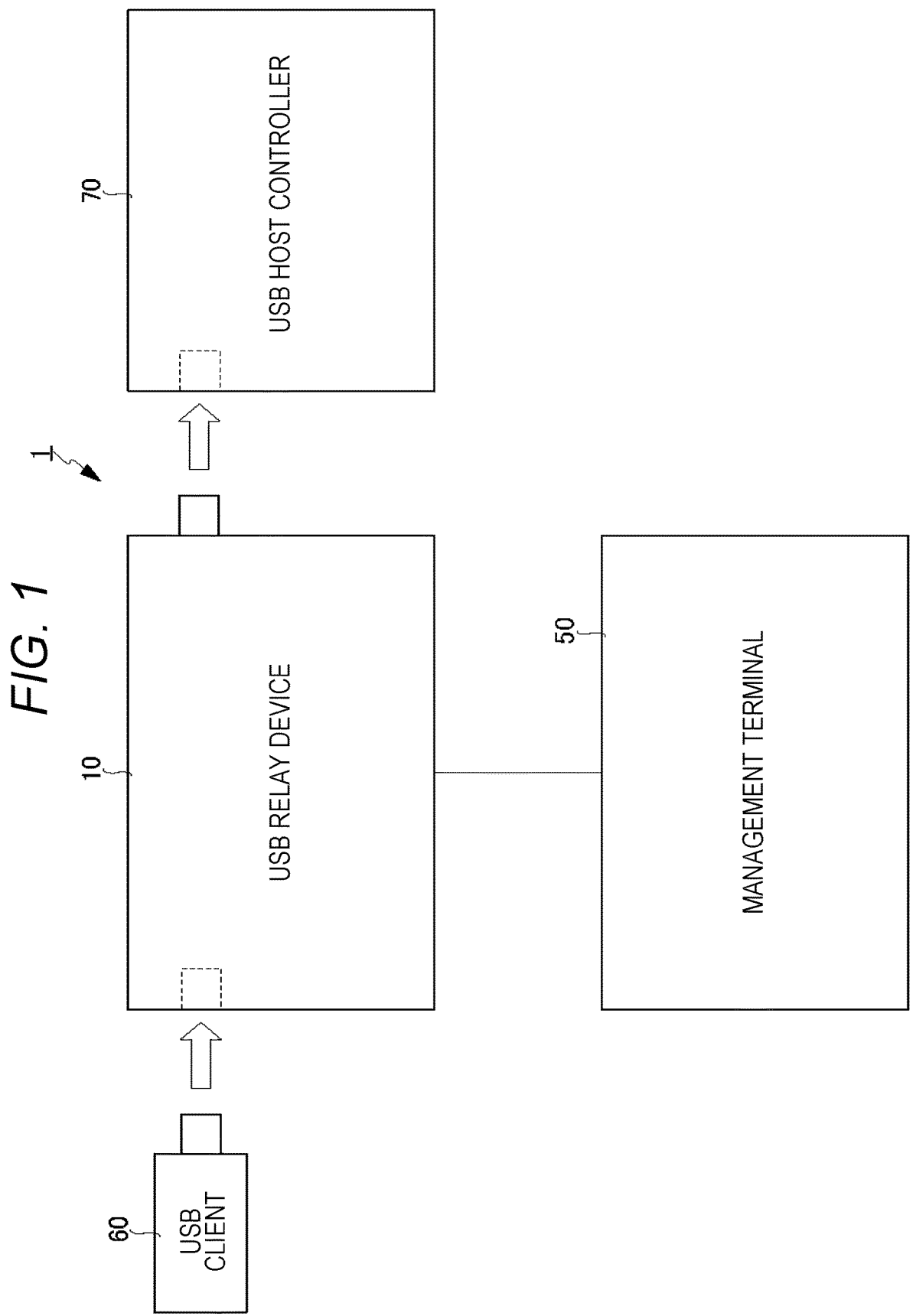
FIG. 1 is an example of a block diagram schematically showing a system configuration of a USB management system according to an embodiment of the present invention.

Hereinafter, modes for carrying out the present invention (hereinafter, referred to as "embodiments") will be described in detail using the drawings. The present invention is not limited to the embodiments. In the following description and the respective drawings, the same reference numerals will be used for the same elements or elements having the same functions and redundant description will be omitted.

<With Respect to Use Environment of USB Relay Device>

First, a use environment of a USB relay device used in a USB management system according to an embodiment of the present invention will be described. Here, the case where a USB host controller to be the connection destination (relay destination) of the USB relay device used in the USB management system according to the present embodiment is a computer used in a performance designed control system will be described as an example. As the control system, a system for managing the operation of a train, a system for managing the operation of a power plant, or the like can be exemplified.

In the control system, a user may connect a USB mass storage (USB device) as a USB client to a USB port of the computer. At this time, for example, in order to prevent an information leakage due to information extraction or a virus infection due to virus mixture, on the contrary, it become important to perform a virus check of files to be exchanged between the USB mass storage and the computer. Therefore, the USB relay device incorporating a virus check function is mounted (connected) as a device (for example, an adapter) for relaying the USB mass storage on the USB port of the computer and is used.

Here, instead of the USB mass storage, other USB device, for example, a USB device such as a keyboard, a mouse, and a printer may be connected to the USB port of the computer. At this time, if the USB relay device is the adapter based on the file exchange, the USB relay device cannot relay other USB device such as the keyboard, the mouse, and the printer. In other words, a USB device other than the USB mass storage cannot be used in a state in which the USB relay device is mounted. Therefore, the user removes the USB relay device connected to the USB port of the computer and directly connects other USB device to the USB port of the computer.

As such, when the USB relay device is the adapter based on the file exchange, the work for removing the USB relay device when other USB device is used and remounting the USB relay device when the USB mass storage is used again becomes necessary and this is troublesome to the user. At this time, if the user forgets to remount the USB relay device to the USB port of the computer, for example, there is a danger that the information leakage occurs due to the information extraction or the virus infection occurs due to the virus mixture, on the contrary.

In order to eliminate the troublesomeness of the work to the user, the risk of the virus infection due to forgetting to mount the USB relay device, or the like, the USB relay device according to the present example is configured to cope with the use of the USB device such as the keyboard, the mouse, and the printer without changing the current system.

Specifically, the USB relay device according to the present example is configured to include a connection switching unit for switching a connection state (path) between a first connector portion to which the USB client is connected and a second connector portion which is connected to the USB host controller. As the connection switching unit, it is preferable to use a high-speed analog switch.

Here, the performance designed control system has been exemplified as the use environment of the USB relay device according to the present example. However, this is merely an example and the USB relay device is not limited to the above use environment. For example, a general OA system may be used as the use environment of the USB relay device. That is, the present USB relay device can be used as a relay device of a USB device (USB client) connected to a USB port of a computer (USB host controller) used in the general OA system, in addition to the performance designed control system.

The USB relay device according to the present example can be used as the adapter. Further, the USB relay device according to the present example makes it possible to securely use the USB mass storage while maintaining the versatility of the USB port. Hereinafter, a USB management system using the USB relay device capable of coping with the use of the USB devices such as the keyboard, the mouse, and the printer without changing the current system will be described.

<USB Management System>

FIG. 1 is an example of a block diagram schematically showing a system configuration of a USB management system according to an embodiment of the present invention.

A USB management system 1 according to the present embodiment includes a USB relay device 10 that relays connection of a USB client 60 to a USB host controller 70 and a management terminal 50 such as a server that unitarily manages the USB client 60 through the USB relay device 10 and is configured to manage the connection of the USB client 60 to the USB relay device 10. Here, a connection form between the USB relay device 10 and the management terminal 50 is not particularly limited and it may be wired connection or wireless connection.

As the USB client 60, a USB mass storage or a USB device such as a keyboard, a mouse, and a printer can be exemplified. As the USB host controller 70, a computer or the like used in a performance designed control system can be exemplified. Specific configurations of the USB relay device 10 and the management terminal 50 in the USB management system 1 according to the present embodiment will be described below.

[USB Relay Device]

Figure 2:
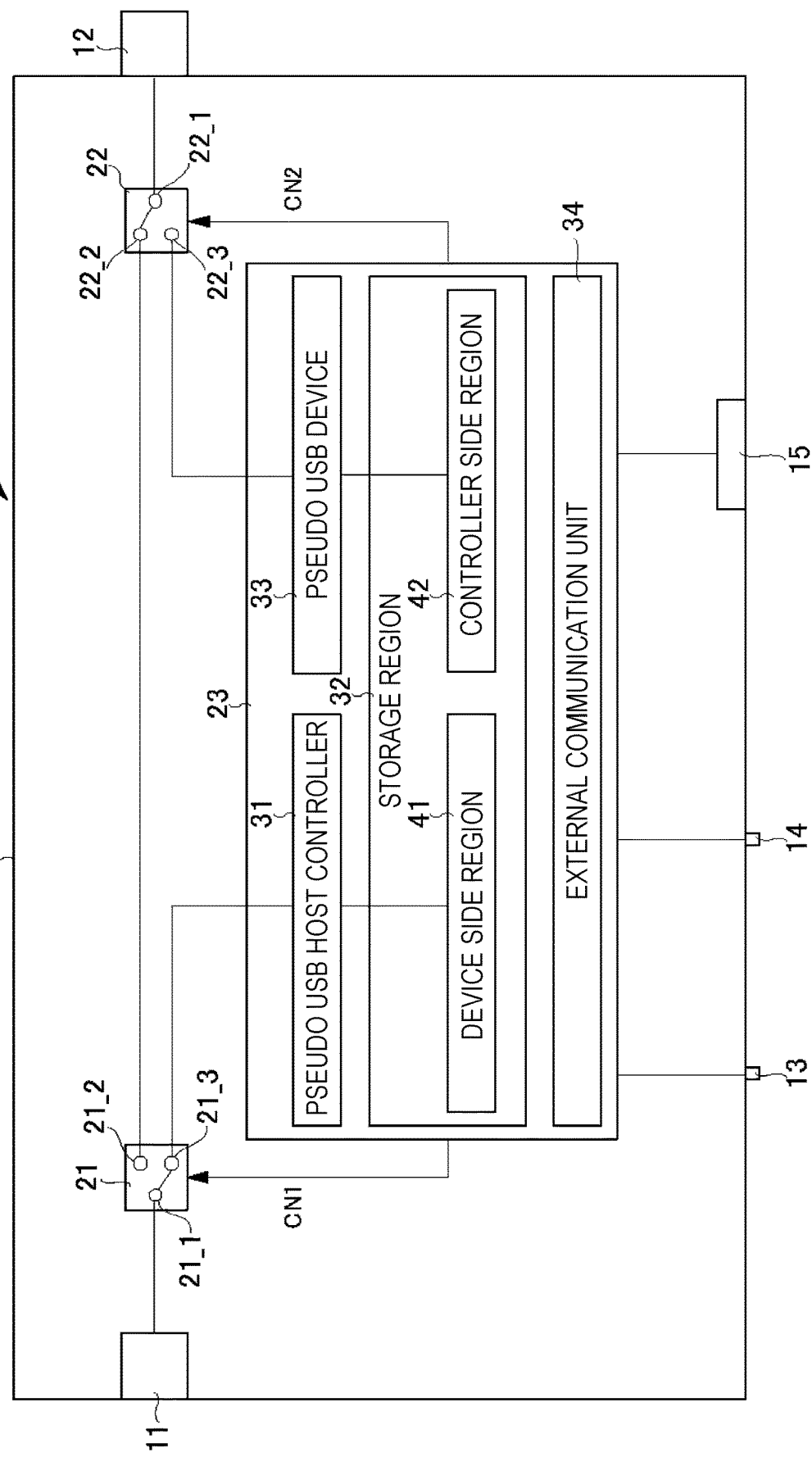
FIG. 2 is an example of a block diagram showing an example of a circuit configuration of a USB relay device.

FIG. 2 is an example of a block diagram showing an example of a circuit configuration of the USB relay device 10. As shown in FIG. 2, the USB relay device 10 includes a first connector portion 11, a second connector portion 12, a light emitting unit 13, a report unit 14, and a communication interface 15 on an outer wall portion of a casing 16. The USB relay device 10 further includes a first switch unit 21, a second switch unit 22, and a control unit 23 in the casing 16.

The first connector portion 11 is a USB connector female to which a USB client, for example, a USB mass storage or other USB device is connected. As other USB device, a device (apparatus) such as a keyboard, a mouse, and a printer can be exemplified. The second connector portion 12 is a USB connector male connected to a USB port of a USB host controller, for example, a computer.

The light emitting unit 13 is composed of, for example, a light emitting diode (LED) and turns on or blinks the LED, thereby notifying a user that an unmanaged USB device has been connected. The report unit 14 is composed of, for example, a speaker or a buzzer and outputs a notification sound from the speaker or sounds the buzzer, thereby notifying the user that the unmanaged USB device has been connected. These notifications are executed under the control of the control unit 23. The communication interface 15 is an interface that communicates with the management terminal 50 by radio or wire.

The first switch unit 21 is composed of an analog switch having a movable contact 21_1 and two fixed contacts 21_2 and 21_3 and the movable contact 21_1 is electrically connected to the first connector portion 11. The fixed contact 21_2 is electrically connected to the second switch unit 22 (fixed contact 22_2). The fixed contact 21_3 is electrically connected to the control unit 23.

The second switch unit 22 is composed of a high-speed analog switch having a movable contact 22_1 and two fixed contacts 22_2 and 22_3 and the movable contact 22_1 is electrically connected to the second connector portion 12. Further, the fixed contact 22_2 of the second switch unit 22 and the fixed contact 21_2 of the first switch unit 21 are electrically connected to each other and the fixed contact 22_3 is electrically connected to the control unit 23.

The control unit 23 is composed of, for example, a well-known microcomputer having a central processing unit (CPU), a read only memory (ROM) for storing a program executed by the CPU, and a random access memory (RAM) used as a work area of the CPU. The control unit 23 internally has a pseudo USB host controller 31, a storage region 32, a pseudo USB device 33, and an external communication unit 34 and relays files input and output through the first connector portion 11 or the second connector portion 12. Further, the control unit 23 performs switching control of the first switch unit 21 by a switch control signal CN1 and performs switching control of the second switch unit 22 by a switch control signal CN2.

The pseudo USB host controller 31 is one of function units of the control unit 23 and is realized by executing a general-purpose program stored in the ROM by the CPU. An input terminal of the pseudo USB host controller 31 is electrically connected to the fixed contact 21_3 of the first switch unit 21.

The storage region 32 has a device side region 41 and a controller side region 42 and these regions are configured to be developed on the RAM.

The pseudo USB device 33 is one of the function units of the control unit 23 and is realized by executing a general-purpose program stored in the ROM by the CPU. An output terminal of the pseudo USB device 33 is electrically connected to the fixed contact 22_3 of the second switch unit 22.

The external communication unit 34 communicates with the management terminal 50 to be an external device via the communication interface 15. Specifically, when the USB client 60 is connected to the first connector portion 11, management information obtained by reading from the USB client 60 is transmitted to the management terminal 50. As management information of the USB client 60, a device ID, a serial ID, a USB relay device ID, and a file name can be exemplified. Further, the external communication unit 34 transfers the file input through the first connector portion 11 or the second connector portion 12 to the management terminal 50.

In the USB relay device 10 having the above configuration, the first switch unit 21 and the second switch unit 22 constitute a connection switching unit that switches a connection state (path) between the first connector portion 11 and the second connector portion 12. The connection state between the first connector portion 11 and the second connector portion 12 includes a first connection state in which the first switch unit 21 and the second switch unit 22 are electrically connected and a second connection state in which the control unit 23 and the first connector portion 11 and the second connector portion 12 are electrically connected. Further, only one connector portion of the first connector portion 11 and the second connector portion 12 is connected to the control unit 23 and the other connector portion is not connected to the control unit 23, so that the connection state can become a cutoff state in which the first connector portion 11 and the second connector portion are not electrically connected.

[Management Terminal]

Figure 3:
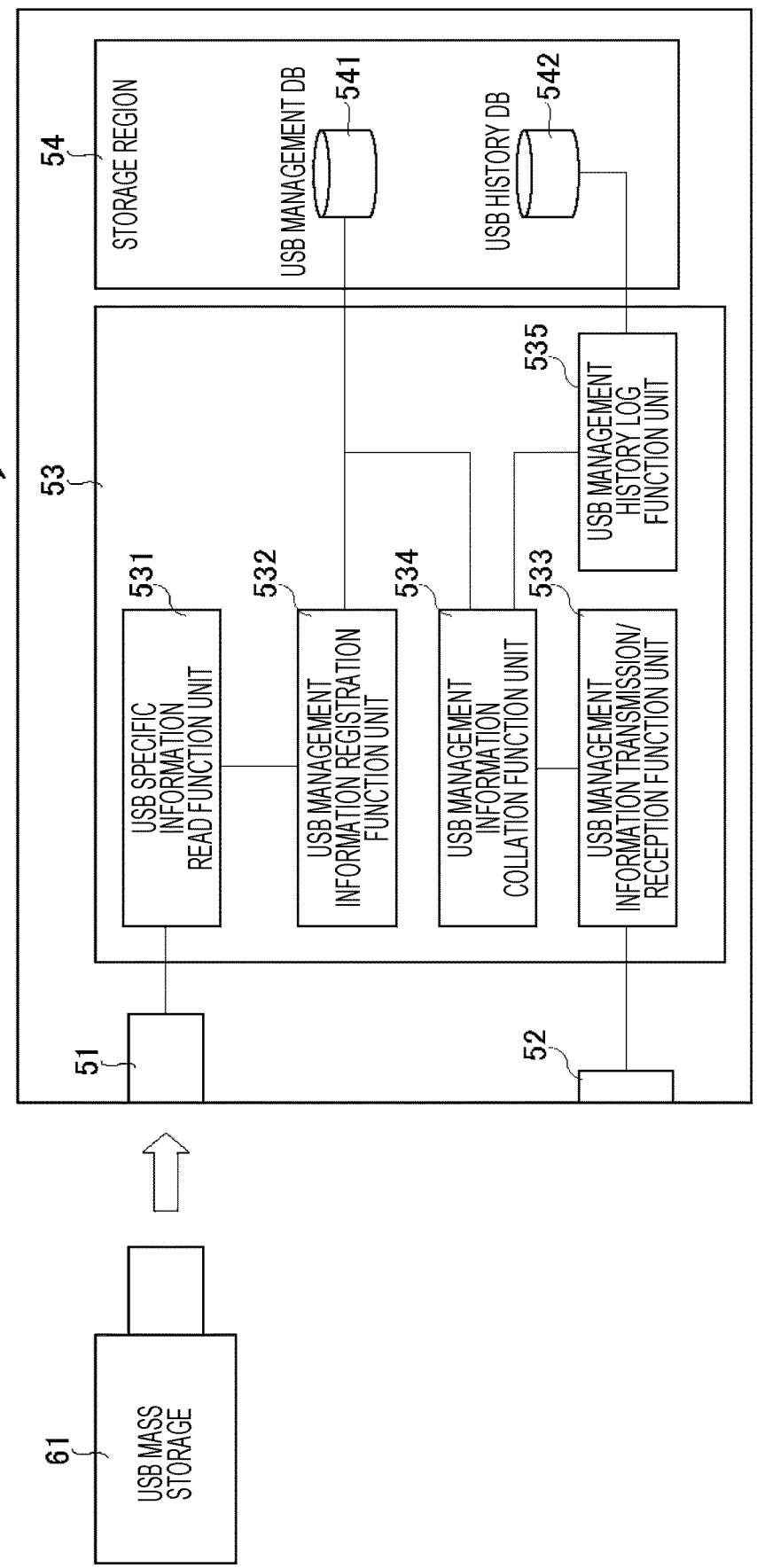
FIG. 3 is an example of a block diagram showing an example of a circuit configuration of a management terminal.

FIG. 3 is an example of a block diagram showing an example of a circuit configuration of the management terminal 50. As shown in FIG. 3, the management terminal includes a connector portion 51, a communication interface 52, a control unit 53, and a storage region 54. The connector portion 51 is a USB connector female to which a USB mass storage (USB memory) 61 is connected. The communication interface 52 is an interface that communicates with the USB relay device 10 by radio or wire.

The control unit 53 is composed of, for example, a well-known microcomputer having a CPU, a ROM for storing a program executed by the CPU, and a RAM used as a work area of the CPU. The control unit 53 has respective function units of a USB specific information read function unit 531, a USB management information registration function unit 532, a USB management information transmission/reception function unit 533, a USB management information collation function unit 534, and a USB management history log function unit 535. These function units are realized by executing general-purpose programs stored in the ROM by the CPU.

The storage region 54 has a USB management database (DB) 541 for recording management information for managing the USB mass storage 61 connected to the connector portion and a USB history database 542 for recording a file transfer history or a transfer file as a log. As the management information of the USB mass storage 61, a device ID and a serial ID of the USB mass storage 61 and a user name, a permission period, a permitted USB relay device ID, and a permitted file name input by a manager can be exemplified.

In the control unit 53, when the USB mass storage 61 is connected to the connector portion 51, the USB specific information read function unit 531 reads the device ID and the serial ID of the USB mass storage 61 as the management information. The USB management information registration function unit 532 records each information of the device ID and the serial ID read by the USB specific information read function unit 531 in the USB management database 541, together with other management information. As other management information, a user name, a permission period, a permitted USB relay device ID, and a permitted file name input by the manager can be exemplified.

When the USB mass storage 61 is connected to the USB relay device 10, the USB management information transmission/reception function unit 533 receives each information of the device ID, the serial ID, the USB relay device ID, and the file name, transmitted from the USB relay device 10, via the communication interface 52. The USB management information collation function unit 534 inquires of the USB management database 541 about the information received by the USB management information transmission/reception function unit 533. The USB management history log function unit 535 records the history of the file transfer from the USB relay device 10 or the transfer file as a log in the USB history database 542.

[Flow of Processing of USB Management Method]

Next, a flow of processing of a USB management method in the USB management system 1 according to the present embodiment having the above configuration will be described.

(Registration of Management Information of USB Mass Storage)

First, processing for previously registering the management information of the USB mass storage 61 in the USB management database 541 will be described. The registration of the management information of the USB mass storage 61 in the USB management database 541 is performed by connecting the USB mass storage 61 to the connector portion 51 of the management terminal 50.

Figure 4:
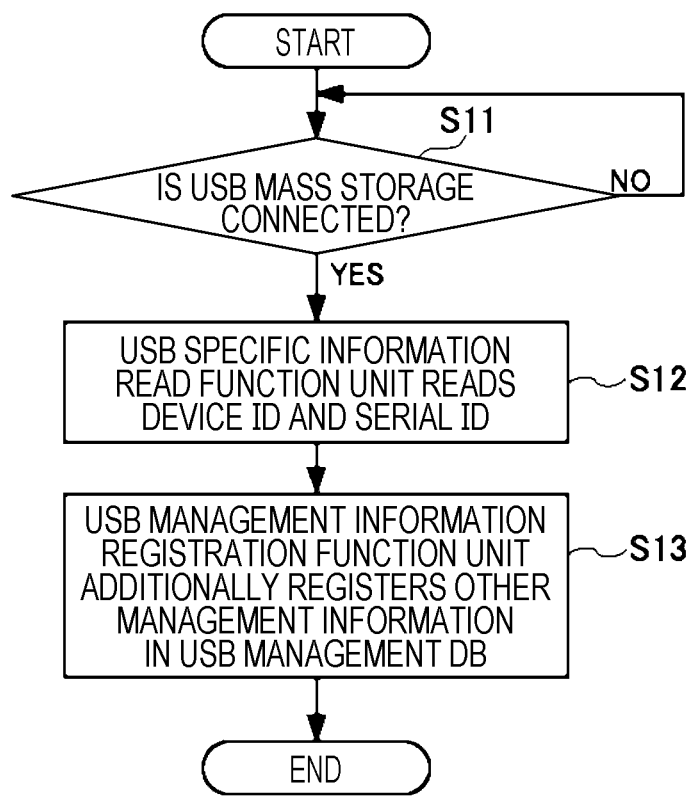
FIG. 4 is an example of a flowchart showing an example of processing for previously registering management information of a USB mass storage in a USB management database.

FIG. 4 is an example of a flowchart showing an example of processing for previously registering the management information of the USB mass storage 61 in the USB management database 541. This processing is executed under the control of each function unit of the control unit 53 of the management terminal 50.

The USB specific information read function unit 531 monitors connection of the USB mass storage 61 to the connector portion 51 of the management terminal 50 (step S11). When the USB mass storage 61 is connected to the connector portion 51 of the management terminal 50, the USB specific information read function unit 531 reads the device ID and the serial ID of the USB mass storage 61 as the management information (step S12). Next, the USB management information registration function unit 532 registers each information of the device ID and the serial ID read by the USB specific information read function unit 531 in the USB management database 541, together with other management information (specifically, the user name, the permission period, the permitted USB relay device ID, and the permitted file name input by the manager) (step S13).

By the series of processing described above, as the management information of the USB mass storage 61, the device ID and the serial ID of the USB mass storage 61 are previously registered in the USB management database 541, together with the user name, the permission period, the permitted USB relay device ID, and the permitted file name input by the manager.

At the time of registering the management information of the USB mass storage 61, a virus check may be performed on the USB mass storage 61 and then the management information of the USB mass storage 61 may be registered.

(Connection of USB Client)

Next, processing when the USB client 60 to be the USB device is connected to the first connector portion 11 of the USB relay device 10 will be described using flowcharts of FIGS. 5, 6, and 7.

Figure 5:
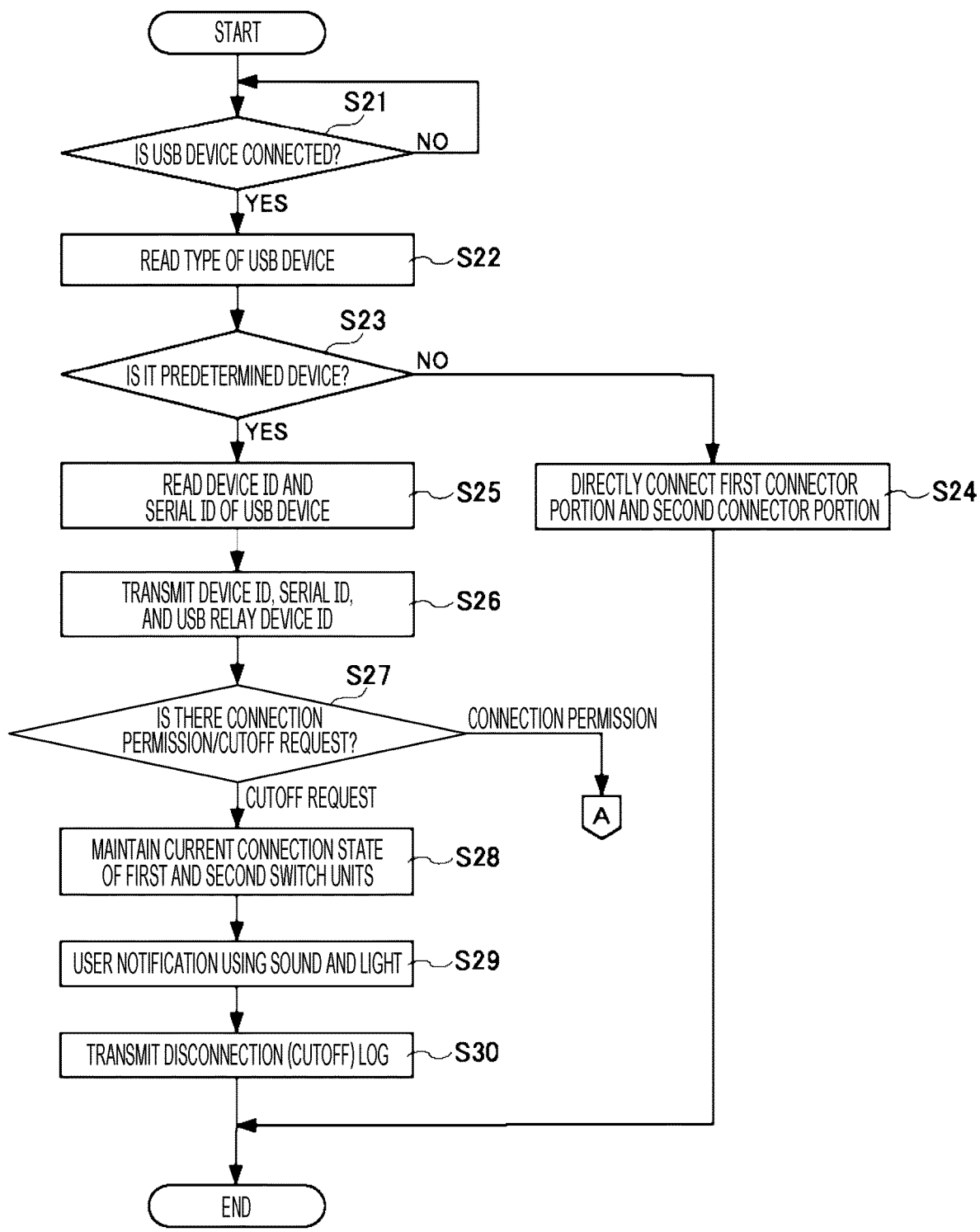
FIG. 5 is an example (first example) of a flowchart showing an example of processing of a USB relay device when a USB client is connected.
Figure 6:
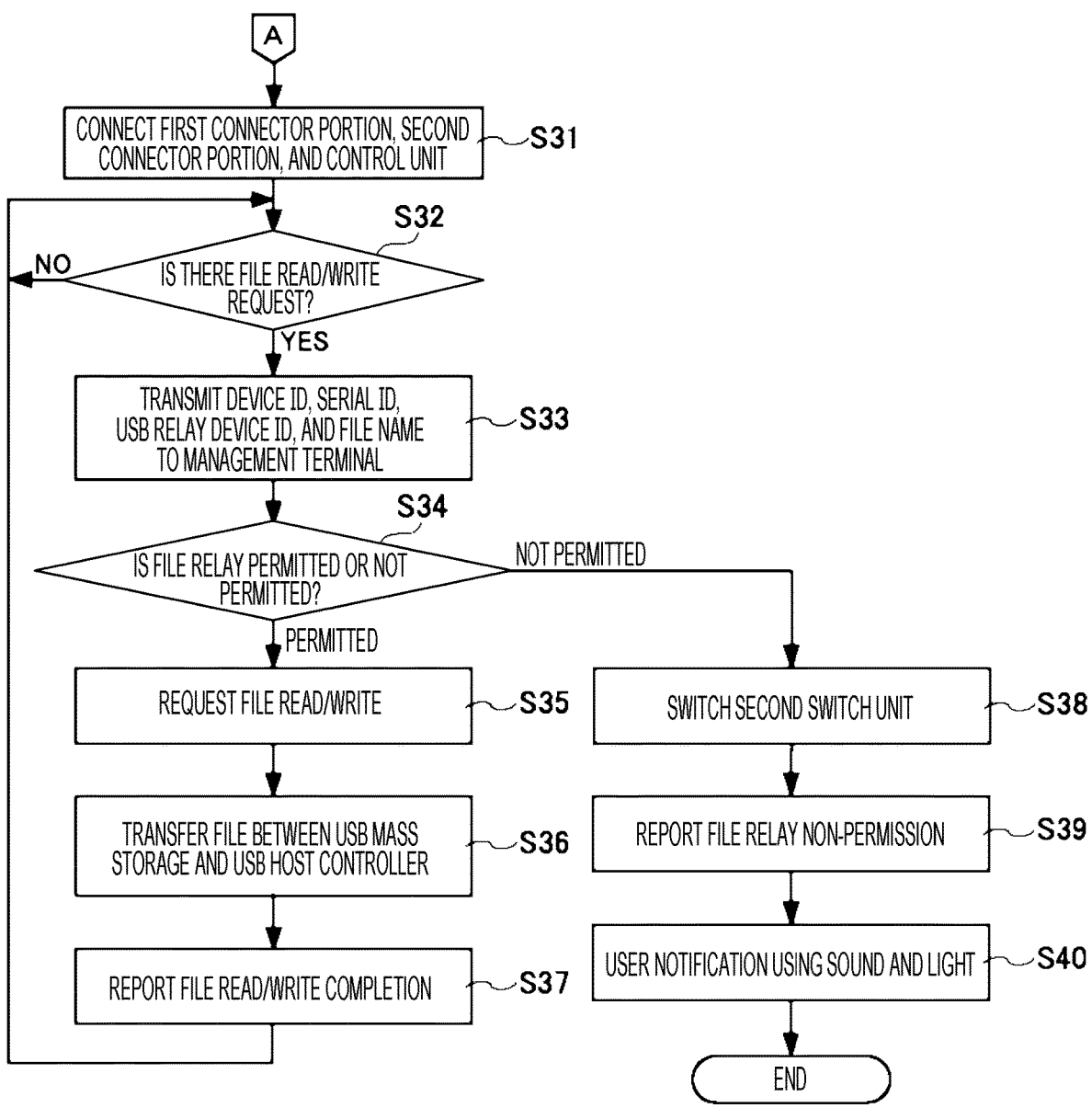
FIG. 6 is an example (second example) of a flowchart showing an example of processing of a USB relay device when a USB client is connected.
Figure 7:
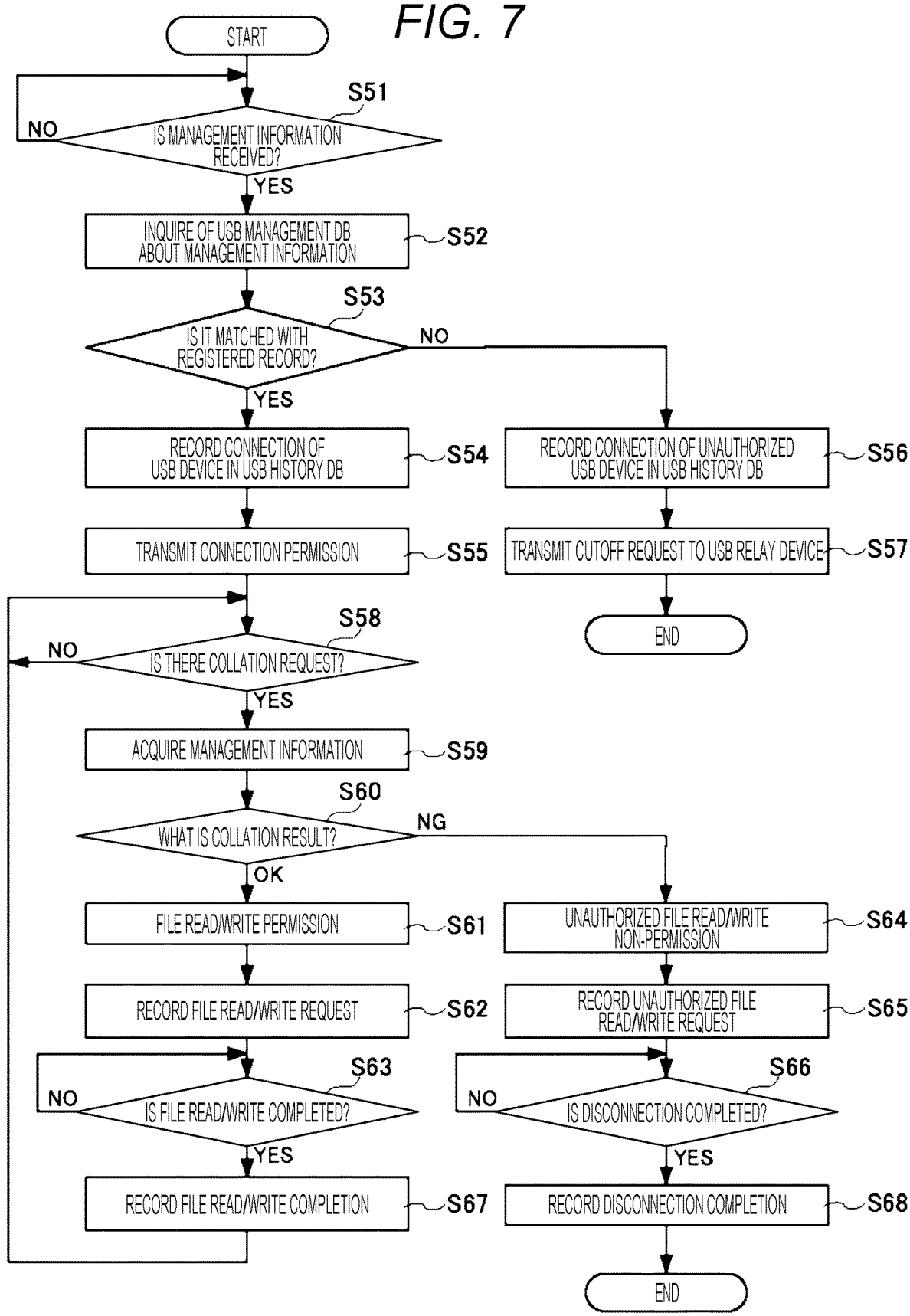
FIG. 7 is an example of a flowchart showing an example of processing of a management terminal when a USB client is connected.

FIGS. 5 and 6 are (first and second) examples of a flowchart showing an example of processing of the USB relay device 10 when the USB client 60 is connected. This processing is executed under the control of each function unit of the control unit 23 of the USB relay device 10. FIG. 7 is an example of a flowchart showing an example of processing of the management terminal 50 when the USB client 60 is connected. This processing is executed under the control of each function unit of the control unit 53 of the management terminal 50.

In the USB relay device 10 (refer to FIG. 5), when the second connector portion 12 is connected to the USB port of the computer to be an example of the USB host controller 70, power is supplied from the computer to the USB relay device 10 via the second connector portion 12. At this time, as shown in FIG. 2, the movable contact 21_1 of the first switch unit 21 is connected to the side of the fixed contact 21_3 and the movable contact 22_1 of the second switch unit 22 is connected to the side of the fixed contact 22_2. This state is an initial state of the USB relay device 10. In the initial state, since the first connector portion 11 and the second connector portion 12 are not electrically connected, a state becomes the "cutoff state" described above.

In the initial state, the pseudo USB host controller 31 of the control unit 23 monitors the connection of the USB device (USB client 60) to the first connector portion (step S21). When the USB device is connected, communication is performed between the pseudo USB host controller 31 and the USB device. By the communication, the pseudo USB host controller 31 acquires information of a type (for example, a device type or an interface type) of the USB device, according to a USB communication protocol (step S22).

Here, it is possible to determine the type of the USB device, that is, whether the USB device is a specific device (in the present example, the USB mass storage) or other USB device, from the information of the device type or the interface type. Therefore, the control unit 23 determines whether or not the USB device connected to the first connector portion 11 is a predetermined device such as the USB mass storage 61, on the basis of the information of the type of the USB device acquired in step S22 (step S23).

In this determination processing, when it is determined that the USB device connected to the first connector portion 11 is a device other than the predetermined device such as the USB mass storage 61, like a USB device (for example, a keyboard, a mouse, a printer, or the like) other than a USB storage (NO in S23), the pseudo USB host controller 31 causes the first switch unit and the second switch unit 22 to enter the first connection state (step S24). The first connection state is a state in which the first connector portion 11 and the second connector portion 12 are electrically connected directly. Specifically, the first switch unit 21 enters a state in which the movable contact 21_1 is connected to the side of the fixed contact 21_2 and the second switch unit enters a state in which the movable contact 22_1 is connected to the side of the fixed contact 22_2.

At this time, for the device other than the predetermined device, for example, other USB device such as the keyboard, the mouse, and the printer, a connection history thereof may be recorded in the USB history database 542 of the management terminal 50.

When it is determined in the determination processing of step S23 that the USB device connected to the first connector portion 11 is the predetermined device, for example, the USB mass storage 61 (YES in S23), the pseudo USB host controller 31 reads the device ID and the serial ID of the USB mass storage 61 (step S25). Further, the pseudo USB host controller 31 transmits the read device ID and serial ID and the USB relay device ID of the USB relay device 10 as management information of the USB mass storage 61 to the management terminal 50 through the communication interface 15 (step S26). Then, the pseudo USB host controller 31 waits for a connection permission/cutoff request from the management terminal 50 (step S27).

In the management terminal 50 (refer to FIG. 7), the USB management information transmission/reception function unit 533 monitors reception of the management information of the USB mass storage 61 transmitted from the USB relay device 10 (step S51). Then, when the management information is received (YES in S51), the USB management information collation function unit 534 inquires of the USB management database 541 about the management information received by the USB management information transmission/reception function unit 533 (step S52) and determines whether or not the management information is matched with a record (management information of the USB mass storage 61) registered in advance in the USB management database 541 (step S53).

When it is determined in the determination processing of step S53 that the management information is matched with the registered record (YES in S53), the USB management history log function unit 535 records that the USB mass storage 61 has been connected to the USB relay device 10 in the USB history database 542 (step S54). Then, the USB management information transmission/reception function unit 533 transmits a connection permission showing that the USB mass storage 61 may be connected to the USB relay device 10 to the USB relay device 10 via the communication interface 52 (step S55).

When it is determined in the determination processing of step S53 that the management information is not matched with the registered record (NO in S53), the USB management history log function unit 535 determines that an unauthorized USB device has been connected to the USB relay device 10 and records that the unauthorized USB device has been connected in the USB history database 542 (step S56). Then, the USB management information transmission/reception function unit 533 transmits a cutoff request showing that the connection of the USB mass storage 61 to the USB relay device 10 is rejected to the USB relay device 10 via the communication interface 52 (step S57).

The processing of the USB relay device 10 will be described again using the flowchart of FIG. 5. In the USB relay device 10, the pseudo USB host controller 31 monitors reception of a connection permission/cutoff request from the management terminal 50 (step S27). Then, when the cutoff request is received, the pseudo USB host controller 31 maintains the current connection state (initial state to be the cutoff state) of the first switch unit 21 and the second switch unit 22 (step S28). Specifically, the first switch unit 21 is in a state in which the movable contact 21_1 is connected to the side of the fixed contact 21_3 and the second switch unit 22 is in a state in which the movable contact 22_1 is connected to the side of the fixed contact 22_2.

Next, the pseudo USB host controller 31 turns on the LED of the light emitting unit 13 and outputs the notification sound from the speaker of the report unit 14, for example, and notifies the user that the connection of the first connector portion 11 and the second connector portion 12 and the control unit 23 has been disconnected (cut off) (step S29). Then, the pseudo USB host controller 31 transmits a disconnection (cutoff) log to the management terminal 50 (step S30).

Here, here, the LED is turned on in the light emitting unit 13. However, the present invention is not limited thereto and the LED may be blinked in a specific pattern. Further, in the report unit 14, the notification sound is output from the speaker. However, the present invention is not limited thereto and the buzzer may be sounded. Further, it is not always necessary to perform user notification using both the sound and the light and the user notification may be a notification using any one. This is also applied to the following embodiments.

In step S27, when the connection permission is received from the management terminal 50, the processing proceeds to the processing of the flowchart of FIG. 6. Specifically, in the case of the connection permission, the pseudo USB host controller 31 causes the first switch unit and the second switch unit 22 to enter the second connection state in which the first connector portion 11 and the second connector portion 12 and the control unit 23 are connected (step S31). In the second connection state, the first switch unit 21 enters a state in which the movable contact 21_1 is connected to the side of the fixed contact 21_3 and the second switch unit 22 enters a state where the movable contact 22_1 is connected to the side of the fixed contact 22_3.

In the second connection state, the pseudo USB device 33 of the control unit 23 monitors whether or not there is a file read/write request from the side of the USB host controller 70 (step S32). Then, when there is the request (YES in S32), the pseudo USB device 33 transmits the management information, that is, the device ID, the serial ID, the USB relay device ID, and the file name to the management terminal 50 (step S33) and requests the collation of the management information. Then, the pseudo USB device 33 waits for transmission of the file relay permission from the management terminal 50 with respect to the management information collation request (step S34).

The processing of the management terminal 50 will be described again using the flowchart of FIG. 7. After the processing of step S55 or step S57, the USB management information collation function unit 534 waits for transmission of a management information collation request from the USB relay device 10 (step S58). Then, when the collation request is received (YES in S58), the USB management information collation function unit 534 acquires the registered record (management information) from the USB management database 541 (step S59) and performs the collation of the management information (step S60).

In step S60, when a collation result is OK, the USB management information collation function unit 534 transmits a file read/write permission to the USB relay device 10 (step S61) and then records that there has been the file read/write request in the USB history database 542 (step S62). Then, the USB management information collation function unit 534 waits for a report from the USB relay device 10 showing that the file read/write has been completed (step S63).

In step S60, when the collation result is NG, the USB management information collation function unit 534 determines that it is read/write of the unauthorized file and transmits a read/write non-permission of the unauthorized file to the USB relay device 10 (step S64). Then, the USB management information collation function unit 534 records that there has been the read/write request of the unauthorized file in the USB history database 542 (step S65) and waits for a report from the USB relay device showing that the connection of the first connector portion 11 and the second connector portion 12 and the control unit 23 has been completely disconnected (step S66).

The processing of the USB relay device 10 will be described again using the flowchart of FIG. 6. In step S34, when a file relay permission is received from the management terminal 50, the pseudo USB device 33 requests the pseudo USB host controller 31 to read/write the file (step S35). After receiving the above request, the pseudo USB host controller 31 transfers the file between the USB mass storage 61 and the USB host controller 70 (step S36).

Specifically, in the case of reading the file, the pseudo USB host controller 31 reads the file from the USB mass storage 61 and transfers the read file to the USB host controller 70 via the pseudo USB device 33. In the case of writing the file, the pseudo USB device 33 writes the file transferred from the USB host controller 70 to the USB mass storage 61 via the pseudo USB host controller 31. When the write is completed, the pseudo USB host controller 31 reports the file write completion to the pseudo USB device 33.

Then, when the read/write of the file between the USB mass storage 61 and the USB host controller 70 is completed, the pseudo USB device 33 reports the read/write completion of the file to the management terminal 50 (step S37).

On the other hand, in step S34, when a file relay non-permission is received from the management terminal 50, the pseudo USB device 33 switches the second switch unit 22 (step S38). As a result, the second switch unit 22 enters a state in which the movable contact 22_1 is connected to the side of the fixed contact 22_2. The first switch unit is in a state in which the movable contact 21_1 is connected to the side of the fixed contact 21_3.

Next, the pseudo USB device 33 reports the file relay non-permission to the management terminal 50 (step S39). Next, the pseudo USB device 33 turns on the light emitting unit 13 and outputs the notification sound from the report unit 14 and notifies the user of the file relay non-permission (step S40).

The processing of the management terminal 50 will be described again using the flowchart of FIG. 7. In step S63, when a report of the file read/write completion is received from the USB relay device 10, the USB management history log function unit 535 records the file read/write completion in the USB history database 542 (step S67) and then returns to step S58. In step S66, when a report of the disconnection completion of the connection of the first connector portion 11 and the second connector portion 12 and the control unit 23 is received, the USB management history log function unit 535 records the disconnection completion in the USB history database 542 (step S68).

The USB management system 1 according to the present embodiment described above uses the USB relay device 10 capable of switching the connection state (path) between the first connector portion 11 to which the USB client 60 is connected and the second connector portion 12 which is connected to the USB host controller 70. As a result, since the first connector portion 11 and the second connector portion 12 can be selectively connected directly, it is possible to cope with use of other USB devices such as the keyboard, the mouse, and the printer, in addition to the USB mass storage 61.

Further, in the USB management system 1 according to the present embodiment, the management information such as the user name, the permission period, the permitted USB relay device ID, and the permitted file name is issued as a certificate in advance and registered in advance, and the connection of the USB client 60 to the USB relay device 10 is managed. In addition, the management information of the USB client 60 connected to the USB relay device 10 is read, the management information is compared with the management information (previously registration information) of the USB client registered in advance, and the switching control of the connection state by the switches is performed on the basis of the comparison result. Therefore, when an unexpected USB mass storage is used, this can be eliminated. Moreover, according to the USB management system 1 according to the present embodiment, it is possible to collectively manage all of the connection, the history, and the file of the USB client 60.

[Modification]

The present invention is not limited to the embodiments described above and various modifications are included. For example, the embodiments are described in detail to facilitate the understanding of the present invention and are not limited to including all of the described configurations. Further, a part or all of the individual configurations and function units may be designed by integrated circuits and may be realized by hardware. In the embodiments described above, the configuration including the light emitting unit 13 and the report unit 14 is used as the mechanism for notifying the user of the virus detection. However, it is not always necessary to include both the light emitting unit 13 and the report unit 14 and the configuration including any one may be used.

REFERENCE SIGNS LIST

1 USB management system
10 USB relay device
11 first connector portion
12 second connector portion
13 light emitting unit
14 report unit
15 communication interface
21 first switch unit
22 second switch unit
23 control unit
31 pseudo USB host controller
32 storage region
33 pseudo USB device
34 external communication unit
50 management terminal
53 control unit
54 storage region
60 USB client
61 USB mass storage (USB memory)
70 USB host controller
531 USB specific information read function unit
532 USB management information registration function unit
533 USB management information transmission/reception function unit
534 USB management information collation function unit
535 USB management history log function unit
541 USB management database
542 USB history database

The invention claimed is:

1. A USB management system comprising:
a USB relay device having a communication interface, a first connector portion, a second connector portion, and a connection switching unit for switching a connection state between the first connector portion to which a USB client is to be connected and the second connector portion to which a USB host controller is to be connected;
a management terminal which is connected to the USB relay device via the communication interface and has a management database for recording management information of the USB client registered in advance;
wherein when the USB client is connected to the first connector portion, the USB relay device reads the management information of the connected USB client and transmits the management information to the management terminal via the communication interface;

wherein by inquiring of the management database about the management information of the USB client transmitted from the USB relay device and comparing the management information with the management information of the USB client registered in advance, the management terminal determines the connection state by the connection switching unit of the USB relay device;

wherein the USB relay device has a control unit which relays a file input and output through the first connector portion or the second connector portion;

wherein the connection switching unit selectively switches between a first connection state in which the first connector portion and the second connector portion are electrically connected but not electrically connected with the control unit, a second connection state in which the control unit and the first connector portion and the second connector portion are electrically connected, and a cutoff state in which the first connector portion and the second connector portion are not electrically connected, wherein the control unit includes a pseudo USB device; and wherein in the second connection state, the pseudo USB device of the control unit monitors whether or not there is a file read/write request from the side of the USB host controller, and when there is the file read/write request, the pseudo USB device transmits the management information of the USB client to the management terminal and requests collation of the management information, and waits for transmission of a file relay permission from the management terminal with respect to the management information collation request.

2. The USB management system according to claim 1, wherein the connection switching unit has a first switch unit in which a movable contact is connected to the first connector portion and a second switch unit in which a movable contact is connected to the second connector portion, one fixed contact of the first switch unit and one fixed contact of the second switch unit are connected to each other, the other fixed contact of the first switch unit and the other fixed contact of the second switch unit are connected to the control unit, and when the management information of the USB client connected to the first connector portion is matched with a record registered in the management database, a state is caused to become the second connection state by switching control of the first switch unit and the second switch unit.

3. The USB management system according to claim 2, wherein, when the management information of the USB client connected to the first connector portion is not matched with the record registered in the management database, the connection switching unit causes the first switch unit and the second switch unit to enter the cutoff state.

4. The USB management system according to claim 2, wherein, when the USB client connected to the first connector portion is a USB device other than a USB storage, the connection switching unit causes the state to become the first connection state by the switching control of the first switch unit and the second switch unit.

5. The USB management system according to claim 1, wherein, as the management information of the USB client registered in advance, the management terminal records a device ID and a serial ID in the management database, together with a user name, a permission period, a permitted USB relay device ID, and a permitted file name input by a manager.

6. The USB management system according to claim 1, wherein the management terminal has a USB history database that records a file transfer history or a transfer file as a log.

7. A USB management method in a USB management system, the USB management method comprising:

using a USB relay device having a communication interface, a connection switching unit for switching a connection state between a first connector portion to which a USB client is to be connected and a second connector portion to which a USB host controller is to be connected, the USB relay device having a control unit which relays a file input and output through the first connector portion or the second connector portion;

connecting the USB relay device, via the communication interface, to a management terminal having a management database for recording management information of a USB client registered in advance;

when the USB client is connected to the first connector portion, reading the management information of the connected USB client and transmitting the management information to the management terminal, by the USB relay device;

by inquiring of the management database about the management information of the USB client transmitted from the USB relay device and comparing the management information with the management information of the USB client registered in advance, determining, by the management terminal, the connection state by the connection switching unit; and selectively switching, by the connection switching unit, between a first connection state in which the first connector portion and the second connector portion are electrically connected but not electrically connected with the control unit, a second connection state in which the control unit and the first connector portion and the second connector portion are electrically connected, and a cutoff state in which the first connector portion and the second connector portion are not electrically connected, wherein the control unit includes a pseudo USB device, and in the second connection state, the pseudo USB device of the control unit monitors whether or not there is a file read/write request from the side of the USB host controller, and when there is the file read/write request, the pseudo USB device transmits the management information of the USB client to the management terminal and requesting collation of the management information, and waits for transmission of a file relay permission from the management terminal with respect to the management information collation request.

8. The USB management method according to claim 7, wherein the connection switching unit has a first switch unit in which a movable contact is connected to the first connector portion and a second switch unit in which a movable contact is connected to the second connector portion, one fixed contact of the first switch unit and one fixed contact of the second switch unit are connected to each other, the other fixed contact of the first switch unit and the other fixed contact of the second switch unit are connected to the control unit, the USB management method further comprising:

when the management information of the USB client connected to the first connector portion is matched with a record registered in the management database, causing the state to become the second connection state by switching control of the first switch unit and the second switch unit.

9. The USB management method according to claim 8, further comprising:

when the management information of the USB client connected to the first connector portion is not matched with the record registered in the management database, the connection switching unit causing the first switch unit and the second switch unit to enter the cutoff state.

10. The USB management method according to claim 8, further comprising:

when the USB client connected to the first connector portion is a USB device other than a USB storage, the connection switching unit causing the state to become the first connection state by the switching control of the first switch unit and the second switch unit.

11. The USB management method according to claim 7, further comprising:

recording by the management terminal, as the management information of the USB client registered in advance, a device ID and a serial ID in the management database, together with a user name, a permission period, a permitted USB relay device ID, and a permitted file name input by a manager.

12. The USB management method according to claim 7, further comprising:

recording a file transfer history or a transfer file as a log in a USB history database of the management terminal.

* * * * *